United States Patent
Ahrens et al.

(10) Patent No.: US 7,761,432 B2
(45) Date of Patent: Jul. 20, 2010

(54) INHERITABLE FILE SYSTEM PROPERTIES

(75) Inventors: Matthew A. Ahrens, San Francisco, CA (US); Mark J. Maybee, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 263 days.

(21) Appl. No.: 11/432,268

(22) Filed: May 11, 2006

(65) Prior Publication Data

US 2007/0106678 A1    May 10, 2007

Related U.S. Application Data

(60) Provisional application No. 60/733,933, filed on Nov. 4, 2005.

(51) Int. Cl.
*G06F 7/00* (2006.01)

(52) U.S. Cl. .................. 707/693; 707/803; 707/697; 707/797

(58) Field of Classification Search .................. 707/697, 707/693, 803
See application file for complete search history.

(56) References Cited

U.S. PATENT DOCUMENTS

| 5,247,658 | A | * | 9/1993 | Barrett et al. ............... 707/1 |
|---|---|---|---|---|
| 5,745,888 | A | | 4/1998 | Bauer et al. |
| 6,505,232 | B1 | * | 1/2003 | Mighdoll et al. ............ 709/203 |
| 6,779,130 | B2 | | 8/2004 | Sprunt et al. |
| 7,181,523 | B2 | | 2/2007 | Sim |
| 2001/0035873 | A1 | * | 11/2001 | Easter ......................... 345/632 |
| 2002/0052884 | A1 | * | 5/2002 | Farber et al. ............. 707/104.1 |
| 2002/0083073 | A1 | * | 6/2002 | Vaidya et al. ................ 707/102 |
| 2002/0083281 | A1 | * | 6/2002 | Carteau ....................... 711/161 |
| 2003/0101189 | A1 | * | 5/2003 | Lanzatella et al. ........... 707/100 |
| 2004/0024729 | A1 | * | 2/2004 | Worley .......................... 707/1 |
| 2004/0122917 | A1 | | 6/2004 | Menon et al. |
| 2005/0268341 | A1 | * | 12/2005 | Ross ............................. 726/26 |
| 2005/0278383 | A1 | * | 12/2005 | Kazar et al. .................. 707/200 |
| 2006/0015538 | A1 | | 1/2006 | LeTourneau |
| 2006/0020572 | A1 | | 1/2006 | Ishii et al. |
| 2006/0123061 | A1 | | 6/2006 | Puustinen |
| 2006/0212800 | A1 | * | 9/2006 | Kamiya ....................... 715/513 |
| 2007/0043753 | A1 | * | 2/2007 | Basin et al. ................. 707/101 |

* cited by examiner

*Primary Examiner*—John R. Cottingham
*Assistant Examiner*—Nicholas E Allen
(74) *Attorney, Agent, or Firm*—Osha • Liang LLP (57) ABSTRACT

A storage pool, that includes a hierarchical data structure, wherein the hierarchical data structure comprises a plurality of nodes, wherein one of the plurality of nodes corresponds to the file system, and the file system, wherein the file system is associated with a value corresponding to an attribute, wherein the value is determined using the hierarchical data structure.

11 Claims, 7 Drawing Sheets

INHERITABLE FILE SYSTEM PROPERTIES

CROSS REFERENCE TO RELATED APPLICATIONS

This application claims benefit of U.S. Provisional Application Ser. No. 60/733,933 filed on Nov. 4, 2005, entitled "Hierarchical File System Naming and Inheritable File System Properties" in the names of Matthew A. Ahrens, Mark J. Maybee, and Jeffrey S. Bonwick, and is hereby incorporated by reference.

The present application contains subject matter that may be related to the subject matter in the following U.S. patent application, which is assigned to a common assignee: "Hierarchical File System Naming".

BACKGROUND

Each computer is typically associated with a file system for organizing and maintaining files stored (permanently or temporarily) in the computer. Prior to using a file system, the file system must first be mounted onto a mount point. Mounting a file system corresponds to instructing the operating system, which is executing on the computer, to make the file system available to a user of the computer at a specified location (i.e., the mount point).

Before the file system has been mounted, it is typically only identifiable by the raw device name (i.e., the file name corresponding to the physical storage medium) upon which it was created, for example: /dev/dsk/c0t0d0s0. The file system may be subsequently bound, temporarily, to a name after it is mounted, where the name corresponds to the path of the chosen mount point, for example, /export/home. However, the aforementioned temporary name binding only lasts for the duration of the mount. Thus, once the file system is unmounted, the temporary naming binding ceases to exist.

In some instances, the temporary name binding may persist by storing the device-to-mount-point association. For example, the Unix File System (UFS) maintains a /etc/vfstab file, where each entry in the aforementioned file includes, among other information, the following information: (i) a device to mount and (ii) mount point. Using the example above, one entry in the aforementioned file would include /dev/dsk/c0t0d0s0 and /export/home.

In addition to binding a name to a mount point, computer systems include ad hoc functionality to associate properties (e.g., read only, etc.) with a file system. Typically, the association of properties to the file system is done a per-file system basis.

SUMMARY

In general, in one aspect, the invention relates to a storage pool, comprising a hierarchical data structure, wherein the hierarchical data structure comprises a plurality of nodes, wherein one of the plurality of nodes corresponds to the file system, and the file system, wherein the file system is associated with a value corresponding to an attribute, wherein the value is determined using the hierarchical data structure.

In general, in one aspect, the invention relates to a method for determining a value of an attribute associated with a file system, comprising determining whether the value of the attribute is explicitly defined in a node corresponding to the file system in a hierarchical data structure, if the value of the attribute is explicitly defined obtaining the value from the node corresponding to the file system, if the value of the attribute is not explicitly defined tracing a path from the node corresponding to the file system to a node corresponding to a storage pool, and for at least one node encountered determining whether the value of the attribute is explicitly defined, obtaining the value, if the value of the attribute is not explicitly defined, continuing the tracing, if the value of the attribute is not explicitly defined.

In general, in one aspect, the invention relates to a computer readable medium comprising computer executable instructions to determine whether a value of an attribute is explicitly defined in a node corresponding to the file system in a hierarchical data structure, if the value of the attribute is explicitly defined obtain the value from the node corresponding to the file system, if the value of the attribute is not explicitly defined trace a path from the node corresponding to the file system to a node corresponding to a storage pool, and for at least one node encountered determine whether the value of the attribute is explicitly defined, obtain the value, if the value of the attribute is not explicitly defined, continue the tracing, if the value of the attribute is not explicitly defined.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for maintaining a hierarchical data structure to use in naming a file system and associating properties with the file system.

Figure 1:
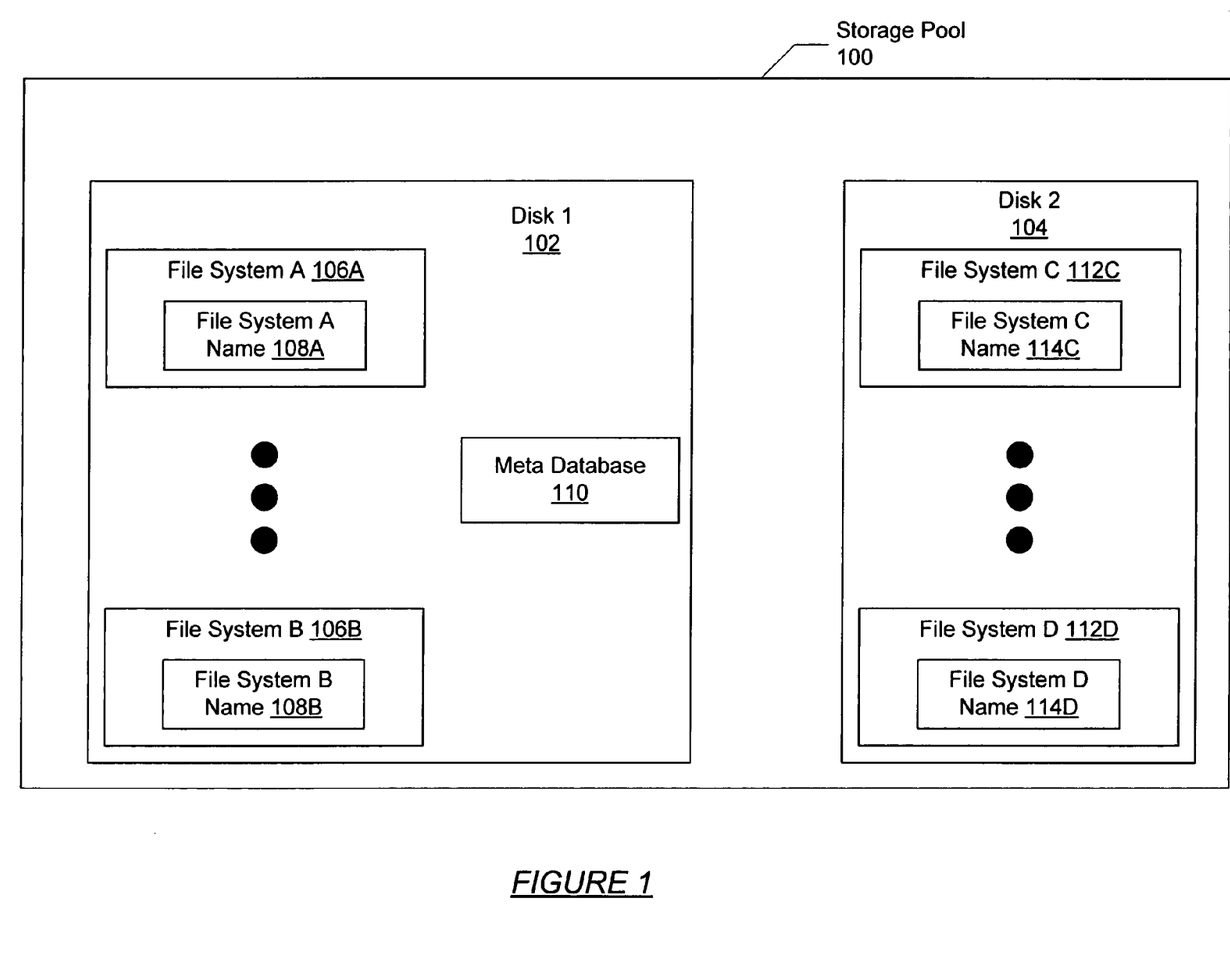
FIG. 1 shows a block diagram of a storage pool in accordance with an embodiment of the invention.

FIG. 1 shows a block diagram of a storage pool in accordance with an embodiment of the invention. As shown in FIG. 1, the storage pool (100) includes two disks: disk 1 (102) and disk 2 (104). Those skilled in the art will appreciate that the storage pool (100) may include more than two disks. Further, each disk (102, 104) may include one or more file systems (e.g., File System A (106A), File System B (106B), File System C (112C), File System D (112D)). In addition, each file system (106A, 106B, 112C, 112D) in the storage pool (100) is associated with a name (e.g., File System A Name (108A), File System B Name (108B), File System C Name (114C), File System D Name (114D)), where the name associated with the file system is independent from the disk upon which it is located or mounted. In one embodiment of the invention, the name of each file system is maintained in a meta database (110).

In one embodiment of the invention, the meta database (110) may correspond to any data structure that is configured to store the names (108A, 108B, 112C, 112D) of the file systems in the storage pool (100). Further, the meta database (110) may also include information about properties associated with each of the file systems (106A, 106B, 112C, 112D). The meta database (110) may be stored on any disk (e.g., disk 1, disk 2) in the storage pool (100).

In one embodiment of the invention, each file system is named using the following naming convention: name=[storage pool name]/([Container Name]*/[File System Name]*)*. Using the aforementioned naming convention, each file system name includes at least the storage pool name (e.g., the name of the storage pool in which the file is located) as well as the specific name of the file system in the storage pool. In addition, the name may also reference additional file systems and/or containers (defined below).

Figure 2:
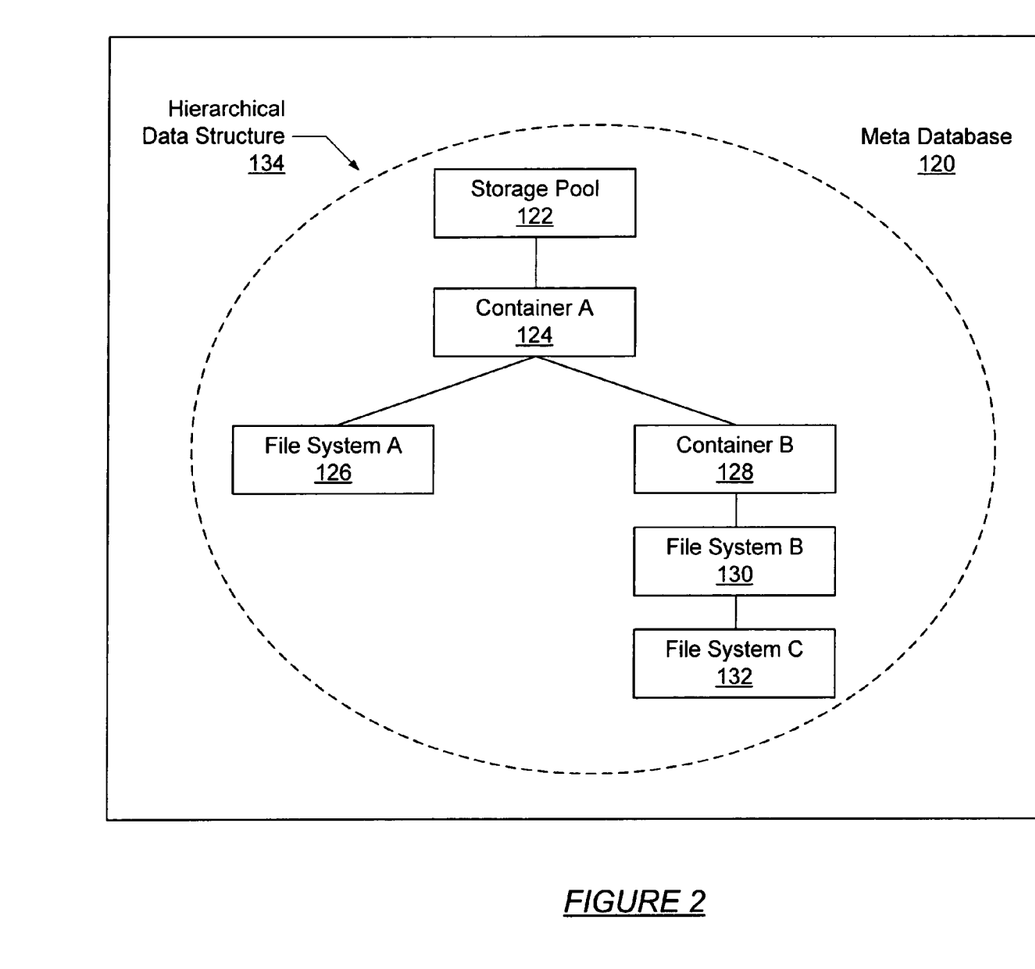
FIG. 2 shows a block diagram of a hierarchical data structure in accordance with one embodiment of the invention.

FIG. 2 shows a block diagram of a hierarchical data structure in accordance with one embodiment of the invention. More specifically, FIG. 2 shows a hierarchical data structure (134) located in a meta database (120), in accordance with one embodiment of the invention. In one embodiment of the invention, the meta database (120) includes a hierarchical data structure (134) in which each node in the hierarchical data structure corresponds to one of the following: (i) a storage pool; (ii) a container; or (iii) a file system. In one embodiment of the invention, the container corresponds to a file system that is not a leaf in the hierarchical data structure. For example, as shown in FIG. 2, the node corresponding to container A (124) conceptually includes the node corresponding to file system A (126) and the node corresponding to container B (128). Further, the node corresponding to container B (128) conceptually includes the node corresponding to file system B (130) and the node corresponding to file system C (132).

In one embodiment of the invention, the name of a file system is determined by tracing a path from the node corresponding to the storage pool to the node corresponding to the file system. With respect to file system A (126), the name for file system A (126) is determined by tracing the path from the node corresponding to the storage pool (122) through the node corresponding to container A (124) and terminating at the node corresponding to file system A (126). Thus, the name for file system A (126) is storage pool/container A/file system A. Similarly, the name for file system B (130) is determined by tracing the path starting at the node corresponding to the storage pool (122), through the node corresponding to container A (126), the node corresponding to container B (128), and eventually terminating at the node corresponding to file system B (130). Thus, the name for file system B (130) is storage pool/container A/container B/file system B. Finally, the name for file system C (132) is determined using the same steps as file system B (130) but terminates at the node corresponding to file system C (132). Accordingly, the name for file system C (132) is storage pool/container A/container B/file system B/file system C.

Those skilled in the art will appreciate that any data structure, not just the hierarchical data shown in FIG. 2 may be used to maintain the names of the file systems in the storage pool. Further, those skilled in the art will appreciate that additional containers and file systems may be added to or removed from the meta database at any time.

Figure 3:
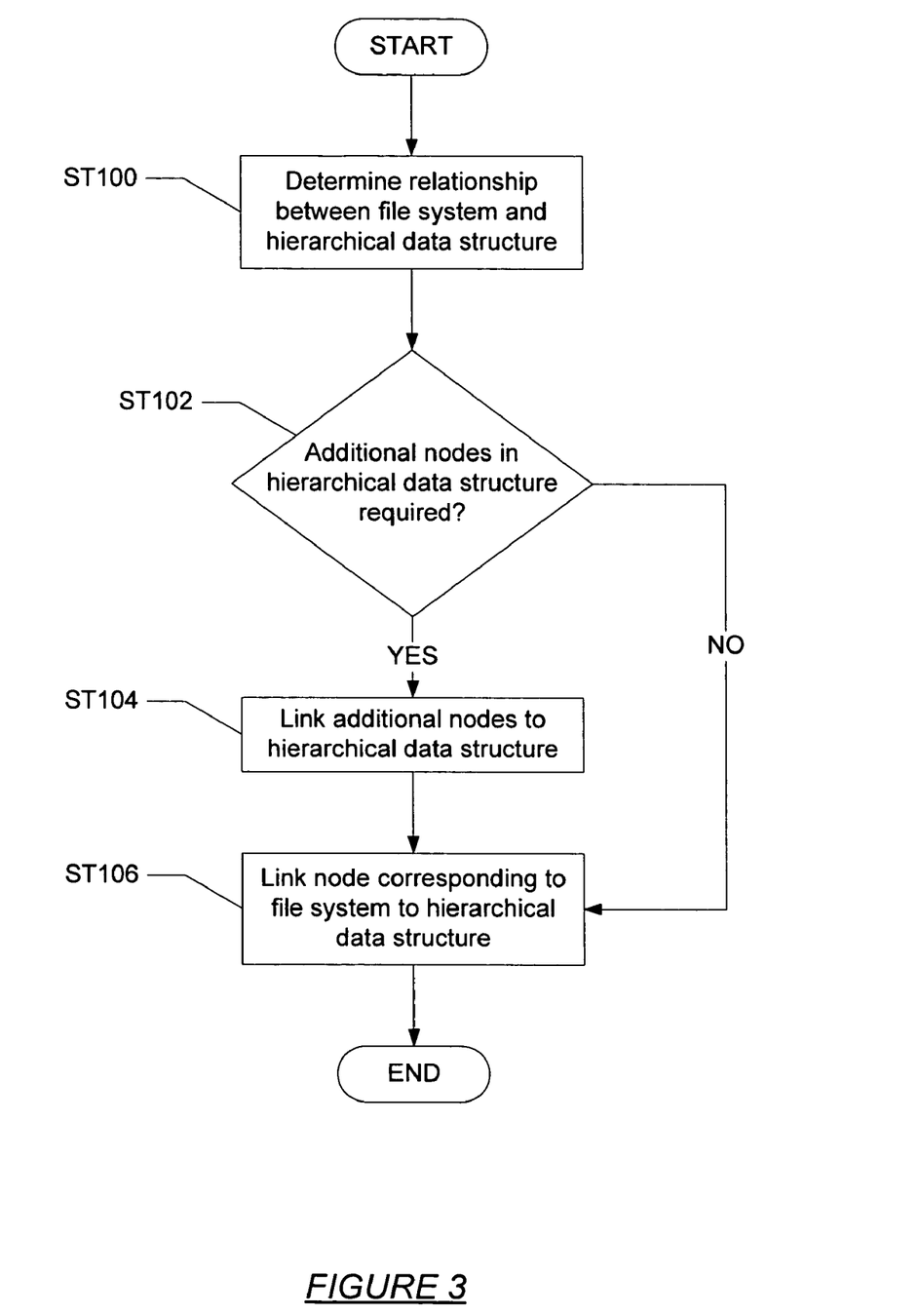
FIG. 3 shows a flowchart in accordance with one embodiment of the invention.

FIG. 3 shows a flow chart in accordance with one embodiment of the invention. More specifically, FIG. 3 shows a method for adding a node to a hierarchical data structure. Alternatively, the method shown in FIG. 3 may also be used to modify the relationships between various nodes in the storage pool. Turning to FIG. 3, initially, a determination is made about the relationship between the file system, which is to be added to the storage pool or renamed, and the hierarchical data structure (ST100). In one embodiment of the invention, determining the relationship corresponds to determining where the node corresponds to the file system (i.e., the file system to be added or renamed) is to be located within the hierarchical data structure. Said another way, ST100 corresponds to determining the node in the hierarchical data structure to which the node corresponding to the file system is to be linked.

Once this determination has been made, a determination is made about whether the relationship determined in ST100 requires the linking additional nodes to the hierarchical data structure prior to linking the node corresponding to the file system to the data structure (ST102). For example, if the file system B is to be linked to container B, then a determination must be made about whether container B is present in the hierarchical data structure.

If additional nodes are required, then the additional nodes are linked to the hierarchical data structure (ST104). Those skilled in the art will appreciate the "linking" corresponds to associating two nodes with one another, such that the nodes, once linked, for part of the hierarchical data structure. Those skilled in the art will appreciate that any data structure may be used to "link" two nodes together.

Returning to FIG. 3, once the additional nodes are linked to the hierarchical data structure (ST104) or if no additional nodes are required (ST106), then the node corresponding to the file system is linked to the hierarchical data structure (ST106). Once the node corresponding to the file system is linked to the hierarchical data structure, the file system name may be determined, as discussed above, by following a path from the node corresponding to the storage pool to the node corresponding to the file system.

Figure 4:
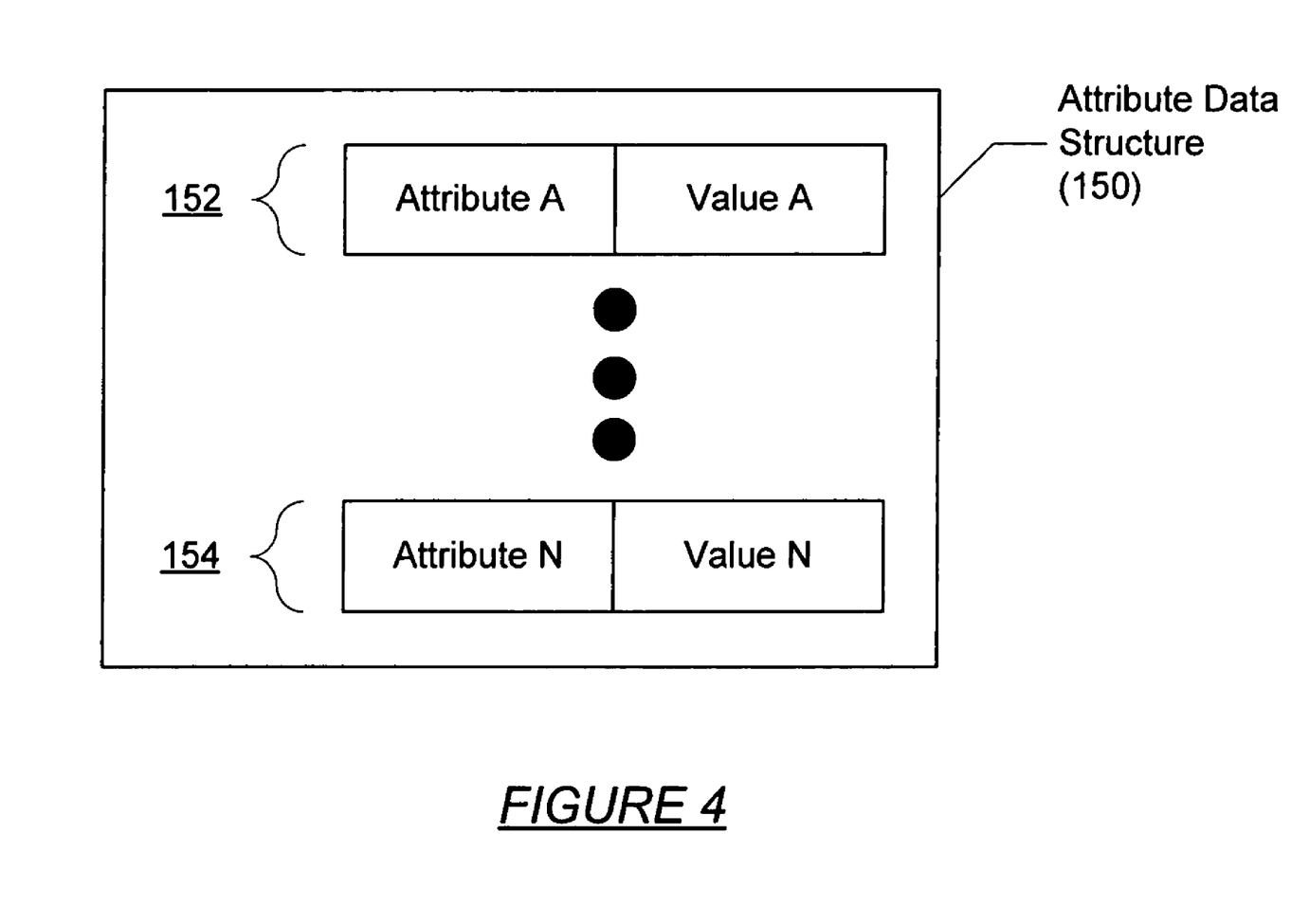
FIG. 4 shows an attribute data structure in accordance with an embodiment of the invention.

FIG. 4 shows an attribute data structure in accordance with an embodiment of the invention. More specifically, FIG. 4 shows an attribute data structure (150) for storing attributes associated with a node (i.e., a storage pool, a container, a file system) in the hierarchical data structure. In one embodiment of the invention, each node may include one or more attributes along with the associated attribute value (e.g., <Attribute A, Value A>(152), ..., <Attribute N, Value N>(154)).

The following is a non-exclusive list of attributes that may be associated with a file system: type (file system type), creation (creation time of file system), referenced (amount of data referenced by the file system), ratio (average compression ratio of file system data), mounted (is the file system mounted), quota (maximum size of file system), reservation (guaranteed available space for file system, recordsize (maximum block size for files in the file system), mountpoint (mount point for file system), sharenfs (is file system exported to nfs?), checksum (type of data checksuming to use), compression (type of data compression to use), atime (is file access time tracked/recorded), devices (are device files supported?), exec (is file execute permission supported?), readonly (is the file system read-only?), and setuid (is the setuid file property honored?)

Figure 5:
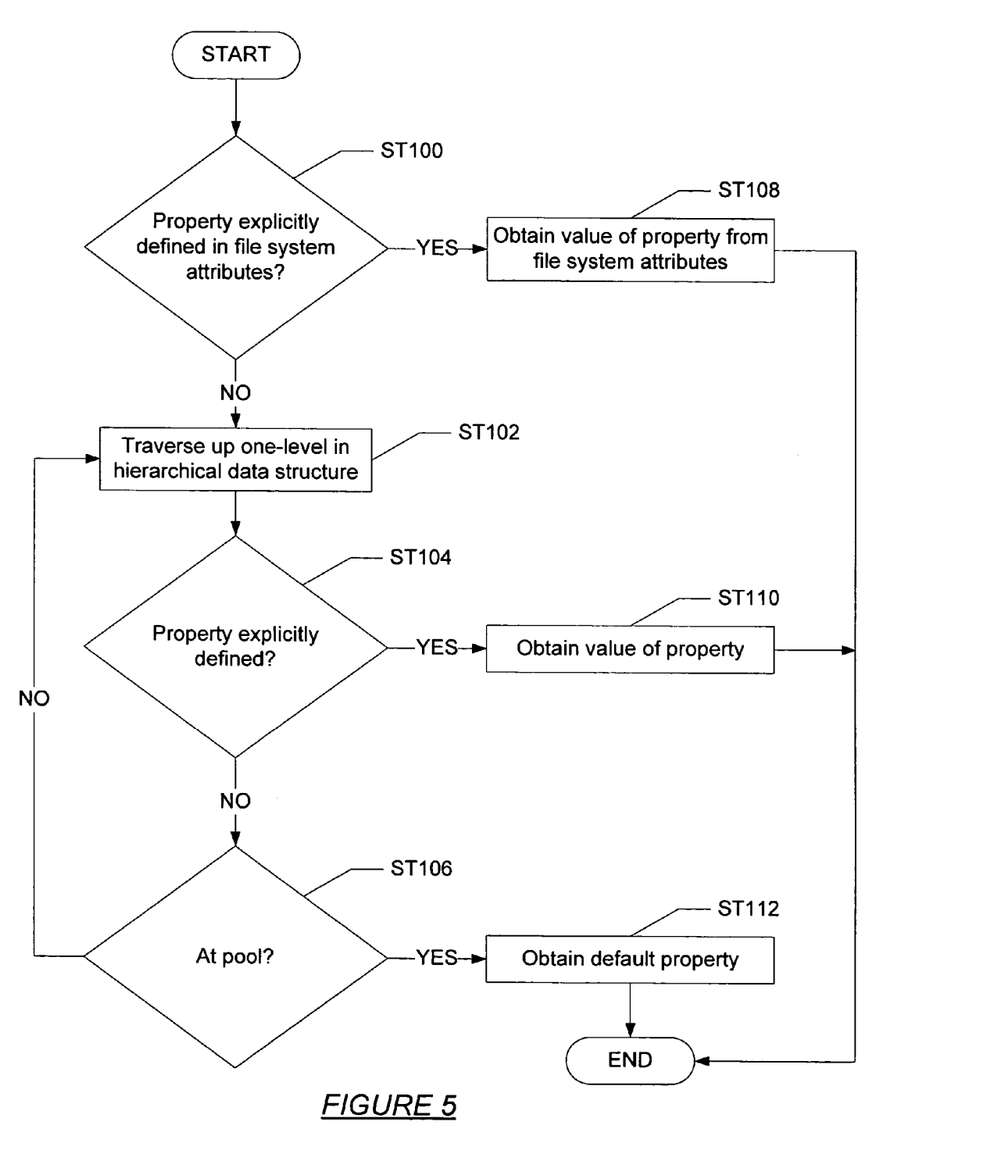
FIG. 5 shows a flow chart in accordance with an embodiment of the invention.

In one embodiment of the invention, if a file system does not have any explicit value for an attribute, then the value of the attribute for the file system is determined using the method shown in FIG. 5.

FIG. 5 shows a flow chart in accordance with an embodiment of the invention. Upon receiving a request for a particular attribute value (e.g., is compression enabled for the file system?), a determination is made about whether the attribute is explicitly defined in the file system attributes (ST100). If the attribute is explicitly defined in the file system attributes, then the attribute value is obtained and the process ends (ST108). However, if the attribute is not explicitly defined in the file system attributes, then the process (i.e., the process servicing the request for the particular attribute value) traverses one-level up in the hierarchical data structure (i.e., to a parent node of the current node) (ST102) and then determines whether the attribute is explicitly defined at this node (ST104). Those skilled in the art appreciate that the node traversed to in ST102 may correspond to the storage pool, a container or a file system.

If the attribute value is explicitly defined for the current node, then the attribute value is obtained and the process ends (ST110). However, if the attribute value is not explicitly defined, then a determination is made about whether the node corresponds to the storage pool (i.e., is the node traversed to in ST102 the root node in the hierarchical data structure) (ST106). If the node corresponds to the storage pool, then the default property of the attribute value is obtained (i.e., the default value set for the storage pool) (ST112). If the node does not correspond to the storage pool, then the method proceeds to ST102.

Figure 6:
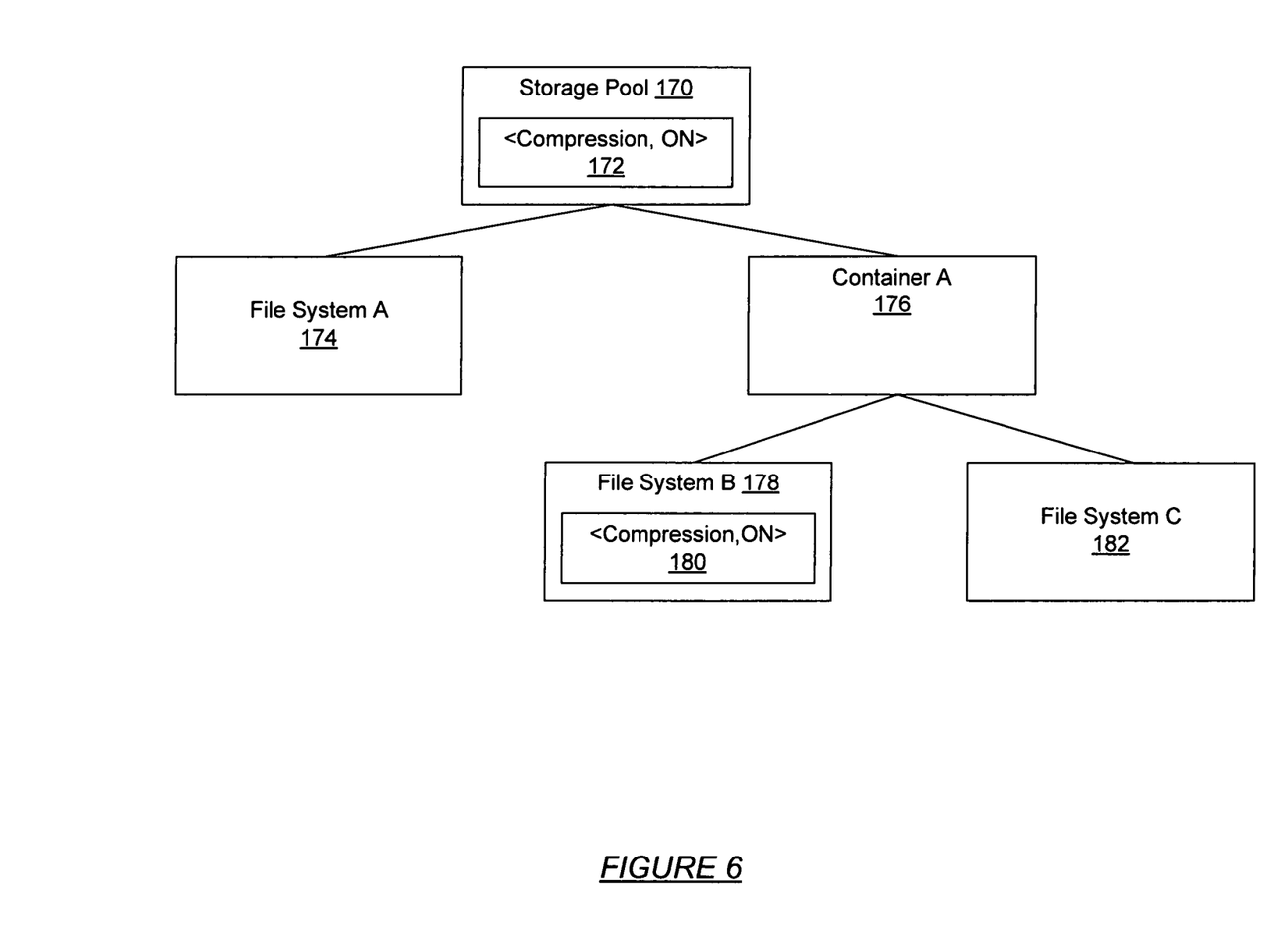
FIG. 6 shows a block diagram of an example in accordance with an embodiment of the invention.
Figure 7:
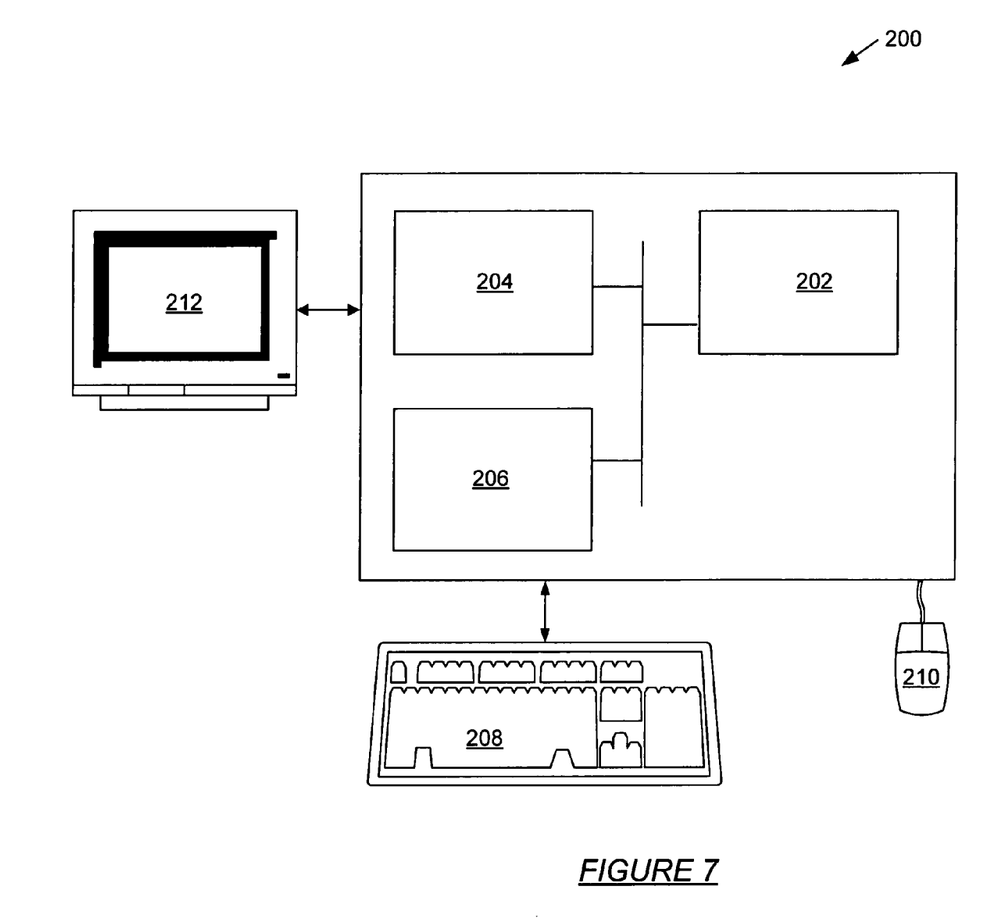
FIG. 7 shows a computer system in accordance with an embodiment of the invention.

FIG. 6 shows an example in accordance with an embodiment of the invention. Using the method shown in FIG. 5, the value of the compression attribute for File System A is determined as follows. Initially, the node corresponding to file system A (174) is queried for a value for the compression attribute. In this case because there is no explicit value for the compression attribute, the process traverses up one level to the node corresponding to the storage pool (170). The node corresponding to the storage pool is subsequently searched for a value for the compression attribute. Because there is an explicit value for the compression attribute, namely, "ON" (172), then file system A inherits this value for the compression attribute.

Using the method shown in FIG. 5, the value of the compression attribute for File System B is determined as follows. Initially, the node corresponding to file system B (178) is queried for a value for the compression attribute. In this case because there is an explicit value for file system B, namely, "ON" (180), the process ends after querying the node corresponding to file system B.

Using the method shown in FIG. 5, the value of the compression attribute for File System C is determined as follows. Initially, the node corresponding to file system C (182) is queried for a value for the compression attribute. In this case because there is no explicit value for the compression attribute, traverse up one level to the node corresponding to container A (176). The node corresponding to container A is subsequently searched for a value for compression. Because there is no explicit value for the compression attribute and because the node corresponding to container A (176) is not the root of the hierarchical data structure, traverse up one level to the node corresponding to storage pool. The node corresponding to the storage pool is subsequently searched for a value for the compression attribute. Because there is an explicit value for the compression attribute, namely, "ON", then container A, as well as file system C, inherits this value for the compression attribute.

The invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer (200) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a processor;
    a memory comprising computer-readable instructions for execution by the processor to determine a value corresponding to an attribute, wherein the value is determined using a hierarchical data structure, and wherein the attribute is one selected from a group consisting of a type of compression to be applied to all data in a first file system and a type of data checksum to be applied to all data in the first file system; and
    a storage pool, comprising:
        a hierarchical data structure, wherein the hierarchical data structure comprises a plurality of nodes, wherein a first node of the plurality of nodes represents the first file system; and
        the first file system associated with the value corresponding to the attribute.

2. The system of claim 1, further comprising:
    a meta database, located in the storage pool, configured to store the hierarchical data structure.

3. The system of claim 2, wherein the first file system is stored on a first disk and the meta database is stored on a second disk, wherein the first disk and the second disk are located in the storage pool.

4. The system of claim 1, wherein the value of the attribute associated with the first file system may be inherited from a first parent node of the first node in the plurality of nodes, wherein the first parent node is one of the plurality of nodes.

5. The system of claim 4, wherein the value of the attribute associated with the first file system may be inherited from a second parent node, wherein the second parent node is a parent node of the first parent node.

6. The system of claim 1, wherein at least one of the plurality of nodes corresponds to the storage pool, wherein the hierarchical data structure comprises metadata associated with the storage pool.

7. The system of claim 1, wherein at least one of the plurality of nodes corresponds to a container, wherein the hierarchical data structure comprises metadata associated with the container.

8. The system of claim 1, wherein computer-readable instructions to determine the value comprises computer-readable instructions to:
   determine whether the value of the attribute is explicitly defined in the first node of the plurality of nodes in the hierarchical data structure;
   when the value of the attribute is explicitly defined in the node:
      obtain the value from the first node of the plurality of nodes;
   when the value of the attribute is not explicitly defined in the node:
      trace a path of nodes from the first node of the plurality of nodes to a second node corresponding to a storage pool, and for at least one node encountered:
         determine whether the value of the attribute is explicitly defined;
         obtain the value, if the value of the attribute is explicitly defined;
         continue the tracing, if the value of the attribute is not explicitly defined; and
      when the value of the attribute is not obtained by the tracing, select a default value.

9. The system of claim 8, wherein the hierarchical data structure comprises a plurality of nodes, wherein each of the plurality of nodes corresponds to one selected from the group consisting of the first file system, a container, and the storage pool.

10. The system of claim 1, wherein the storage pool comprises a plurality of disks.

11. The system of claim 1, wherein the hierarchical data structure comprises a second node of the plurality of nodes, wherein the second node represents a second file system.

* * * * *